(12) United States Patent
Eberhardt

(10) Patent No.: US 12,349,795 B2
(45) Date of Patent: Jul. 8, 2025

(54) COMMERCE SATELLITE FOR AIRPORT SEATING

(71) Applicant: Mark J. Eberhardt, Kenosha, WI (US)

(72) Inventor: Mark J. Eberhardt, Kenosha, WI (US)

( * ) Notice: Subject to any disclaimer, the term of this patent is extended or adjusted under 35 U.S.C. 154(b) by 931 days.

(21) Appl. No.: 17/094,326

(22) Filed: Nov. 10, 2020

(65) Prior Publication Data
US 2021/0150500 A1   May 20, 2021

Related U.S. Application Data

(60) Provisional application No. 63/028,196, filed on May 21, 2020, provisional application No. 62/935,281, filed on Nov. 14, 2019.

(51) Int. Cl.
| | |
|---|---|
| A47C 11/00 | (2006.01) |
| A47C 1/124 | (2006.01) |
| A47C 7/62 | (2006.01) |
| A47C 7/72 | (2006.01) |
| A61H 23/02 | (2006.01) |

(Continued)

(52) U.S. Cl.
CPC ............ *A47C 11/005* (2013.01); *A47C 1/124* (2013.01); *A47C 7/62* (2013.01); *A61H 23/02* (2013.01); *E04H 3/04* (2013.01); *G06Q 20/201* (2013.01); *G06Q 20/202* (2013.01); *G06Q 20/204* (2013.01); *G06Q 20/209* (2013.01); *G06Q 30/0641* (2013.01); *G06Q 50/12* (2013.01); *G07F 17/40* (2013.01); *G07G 1/0009* (2013.01); *G09F 9/30* (2013.01); *G09F 13/22* (2013.01); *A47C 7/622* (2018.08); *A47C 7/72* (2013.01); *A47C 7/723* (2018.08); *A61H 2205/12* (2013.01); *G06Q 30/0268* (2013.01); *G06Q 50/14* (2013.01); *G07F 7/00* (2013.01); *G07F 7/025* (2013.01); *H04B 1/38* (2013.01)

(58) Field of Classification Search
CPC .. G06Q 20/202; G06Q 20/201; G06Q 20/204; G06Q 20/209; G06Q 30/0641; G06Q 50/12; G06Q 30/0268; G06Q 50/14; G06Q 20/102; G06Q 20/127; G06Q 20/18; G06Q 20/28; G06Q 30/0635; G06Q 50/26; A47C 7/62; A47C 7/622; A47C 7/72; A47C 7/723; A47C 1/124; A47C 11/00; A47C 11/005; A61H 23/02; A61H 2205/12; A61H 23/0263; A61H 2201/1207; A61H 2201/164; A61H 2201/501; A61H 2201/502; A61H 2201/5046; A61H 2201/5058; A61H 2201/5097; A61H 2203/0431; A61H 1/00; G07F 17/40; G07F 7/00; G07F 7/025; G07F 17/0021; G07F 17/0042; G07F 17/08; G09F 9/30; G09F 13/22; H04B 1/38; E04H 3/04; G07G 1/0009
See application file for complete search history.

(56) References Cited

U.S. PATENT DOCUMENTS

| | | | | |
|---|---|---|---|---|
| 5,573,500 A | * | 11/1996 | Katsunuma | ........ A61H 23/0254 601/134 |
| 5,597,163 A | * | 1/1997 | Takemoto | ........... G07F 17/3216 273/309 |

(Continued)

*Primary Examiner* — Jeffrey A Shapiro
(74) *Attorney, Agent, or Firm* — Boyle Fredrickson, SC

(57) ABSTRACT

A commerce satellite for airports and the like allows individuals to interact with vendors and airport information systems in a distributed fashion improving social distancing.

15 Claims, 8 Drawing Sheets

(51) Int. Cl.
   *E04H 3/04*          (2006.01)
   *G06Q 20/20*         (2012.01)
   *G06Q 30/0601*       (2023.01)
   *G06Q 50/12*         (2012.01)
   *G07F 17/40*         (2006.01)
   *G07G 1/00*          (2006.01)
   *G09F 9/30*          (2006.01)
   *G09F 13/22*         (2006.01)
   *G06Q 30/0251*       (2023.01)
   *G06Q 50/14*         (2012.01)
   *G07F 7/00*          (2006.01)
   *G07F 7/02*          (2006.01)
   *H04B 1/38*          (2015.01)

(56) References Cited

U.S. PATENT DOCUMENTS

| | | | |
|---|---|---|---|
| 5,807,177 A * | 9/1998 | Takemoto | G07F 17/0014 463/47 |
| 6,227,614 B1 * | 5/2001 | Rubin | A47C 9/022 297/344.1 |
| 7,658,445 B2 * | 2/2010 | Mittler | A47C 15/004 297/217.3 |
| 7,794,014 B2 * | 9/2010 | Beall | G06Q 30/0273 297/217.3 |
| 7,867,085 B2 * | 1/2011 | Pryzby | G07F 17/3227 463/31 |
| 8,113,517 B2 * | 2/2012 | Canterbury | G07F 17/32 463/16 |
| 8,636,570 B2 * | 1/2014 | Tastad | A47C 7/727 463/47 |
| 9,037,161 B1 * | 5/2015 | Azih | H04W 4/33 455/457 |
| 9,058,719 B2 * | 6/2015 | Miner | G07F 17/3204 |
| 9,179,779 B2 * | 11/2015 | Myre | A47C 7/002 |
| 9,457,166 B1 * | 10/2016 | Lasorso, Jr. | A61H 23/0236 |
| 9,730,518 B1 * | 8/2017 | Jacobs | A47C 7/70 |
| 2008/0039215 A1 * | 2/2008 | Hahn | A47C 9/022 463/47 |
| 2009/0054139 A1 * | 2/2009 | Anderson | G07F 17/3234 463/31 |
| 2011/0109134 A1 * | 5/2011 | Filipour | A47C 7/723 463/47 |
| 2012/0031311 A1 * | 2/2012 | Jong | A47C 19/025 108/157.16 |
| 2012/0083331 A1 * | 4/2012 | Carpenter | G07F 17/3244 463/25 |
| 2012/0157896 A1 * | 6/2012 | Kawamoto | A61H 9/0078 601/148 |
| 2012/0203150 A1 | 8/2012 | Eberhardt | |
| 2012/0298798 A1 * | 11/2012 | Henshaw | B64D 11/06 244/118.6 |
| 2012/0315971 A1 * | 12/2012 | Granger | G07F 17/3216 463/16 |
| 2014/0171183 A1 * | 6/2014 | Cardno | G06Q 30/0212 463/25 |
| 2015/0235193 A1 * | 8/2015 | Cummings | G07C 9/27 705/21 |
| 2016/0000647 A1 | 1/2016 | Eberhardt | |
| 2019/0080384 A1 * | 3/2019 | Radcliffe | G06Q 30/0631 |
| 2019/0082852 A1 * | 3/2019 | Guschmer | A47C 1/024 |
| 2019/0232847 A1 * | 8/2019 | Kim | B60N 99/00 |
| 2019/0304216 A1 * | 10/2019 | Mendelson | G07C 9/27 |
| 2020/0184761 A1 * | 6/2020 | Larsen | G07F 17/3216 |
| 2020/0297121 A1 * | 9/2020 | Geva | A47C 7/56 |

* cited by examiner

COMMERCE SATELLITE FOR AIRPORT SEATING

CROSS REFERENCE TO RELATED APPLICATION

This application claims the benefit of U.S. provisional application 62/935,281 filed Nov. 14, 2019 and U.S. provisional application 63/028,196 filed May 21, 2020, both incorporated by reference in their entireties.

FIELD OF THE INVENTION

The present invention relates to public seating in spaces such as airports and in particular to a system for engaging passengers with in-airport commerce, such as with restaurants and stores, while maintaining social distance.

BACKGROUND OF THE INVENTION

Airports derive an important part of their operating income from businesses operating within the airport terminals including stores and restaurants. The ability of air travelers to avail themselves of the services and products offered by these businesses can be constrained by the need for the traveler to stay near his or her gate to be alert to aircraft boarding instructions or changes in aircraft schedules. Travelers, particularly those with small children or who are tired from the fatigue of travel itself, may be reluctant to move about the airport to patronize these businesses. In addition, at times when social distancing is desired, the crowding associated with traditional lounge areas or restaurants may not be preferred.

SUMMARY OF THE INVENTION

The present invention provides compact commerce satellites that can be distributed throughout the airport, for example, among separated airport seating, to provide a seated traveler with current flight information and a wide range of services without leaving his or her seat or associating with crowds. The commerce satellite increases the traveler's access to goods and services in the airport while providing a self-sustaining revenue stream through sales of foot massages that can reinvigorate or improve the circulation of travelers constrained to sit for long periods of time and by displaying useful advertisements. The display screen used for the advertisements can also link the seated individual to important travel information eliminating the need to congregate around signs or kiosks.

In this regard, the invention may also provide a platform base that allows flexible installation of the commerce satellites over carpet or the like and provides an integrated electrical cableway eliminating the need for substantial remodeling when installing or moving the commerce satellites.

Specifically, then, in one embodiment, the invention provides a commerce satellite system including a stand having a base supportable against a floor and a table supported by the stand at an elevation for use by a seated individual adjacent to the stand. A graphic terminal is supported by the stand terminal to provide a graphic display and a user input interface for use by the seated individual. The commerce satellite further includes a wireless transceiver and a computer processor supported by the stand and communicating with the terminal and with the wireless transceiver and operating according to a stored program to: (a) display to the user an order menu through the graphic display; (b) receive input from the user to input an order from the order menu; and (c) transmit the order to a remote order provider together with identification uniquely identifying a commerce satellite system so that the order may be delivered to the user.

It is thus a feature of at least one embodiment of the invention to permit improved access by the traveler to the various services and merchants in an airport without the need for the traveler to physically move (with his or her luggage) to more congested locations where services or goods are provided.

The order menu may link items to item prices and further include a charge terminal providing at least one of a credit card reader and bill accepter communicating with the computer processor and wherein the computer processor further provides an indication of payment of the item price in the transmission of the order.

It is thus a feature of at least one embodiment of the invention to help the traveler avoid the congestion of a normal "checkout" line by providing a distributed payment system.

The electronic computer may receive flight information data from the wireless transceiver and format this information for display on the graphic terminal.

It is thus a feature of at least one embodiment of the invention to eliminate the inconvenience of requiring the traveler to congregate in a crowded gate area or around a central flight display for the purpose of determining the status of his or her flight.

The commerce satellite may include an electrical outlet positioned adjacent to the table and providing at least one of a line output voltage and 5 V output voltage and/or an embedded wireless charging unit.

It is thus a feature of at least one embodiment, of the invention to greatly increase the number of charging stations needed for travelers eliminating congregation around centralized charging kiosks.

The table further may further include at least one upwardly open socket for receiving a beverage can or cup stably therein.

It is thus a feature of at least one embodiment, of the invention to allow the consumer to consume food and beverages at various locations in the airport greatly increasing the capacity of the airport to serve individuals and the convenience to the individuals.

The stand may include a forwardly open pocket near the base providing a sloped platform for receiving feet of the seated individual elevated from the floor in a substantially neutral position.

It is thus a feature of at least one embodiment of the invention to provide the traveler with a convenient footrest improving the comfort of airport seating while avoiding the drawbacks to freestanding ottomans or the like.

The sloped platform maybe connected to a motor unit for vibration of the feet of the seated individual.

It is thus a feature of at least one embodiment of the invention to provide a lower body vibration/massage that can be beneficial for travelers who must sit for extended periods of time.

The table may extend in cantilever over the pocket to beyond a lateral extent of the pocket periphery.

It is thus a feature of at least one embodiment of the invention to eliminate the trip hazard that would be associated with a freestanding foot massage unit.

The commerce satellite may include an illuminated sign indicating that the stand is in use.

It is thus a feature of at least one embodiment of the invention to encourage the use of seating associated with commerce satellites by those requiring the services offered by the commerce satellite.

The commerce satellite may include a visual marking uniquely identifying the commerce satellite.

It is thus a feature of at least one embodiment of the invention to facilitate the delivery of food or merchandise to the traveler without the consumer needing to move through the airport.

The commerce satellite may include an illuminated marking indicating an order has been placed.

It is thus a feature of at least one embodiment of the invention to further simplify the task of identifying a customer by a server.

The table surface may extend continuously at a rear edge to an upwardly and rearwardly sloped backsplash and wherein the visual display is supported within the backsplash It is thus a feature of at least one embodiment of the invention to provide a hygienic surface that can be easily cleaned with a wipe or spray and that is better resistant to beverage spilling.

The base may be in the form of a platform extending laterally from the stand providing a covered cableway for electrical wiring and electrical plugs attached to recessed outlets in the floor.

It is thus a feature of at least one embodiment of the invention to greatly simplify the deployment and reconfiguration of commerce satellites and seating to flexibly accommodate different needs by the airport. The base provides a robust support eliminating the need for permanent installation and allows easy routing of electrical power with reduced tripping risk using standard plugs and cables that may attach to recessed outlets in the floor.

The commerce satellite may further include least one spacer platform releasably attachable to the platform to provide a continuation of a cableway between the spacer platform and the platform.

It is thus a feature of at least one embodiment of the invention to permit a single outlet to be shared among multiple commerce satellites while providing a continuously protected cableway and to permit the spacing of the commerce satellites to provide a desired degree of social distancing.

The platform may provide peripheral edges angled by at least 45° outwardly from the upper surface of the platform as well as a height from the ground of less than 1 inch extending laterally from the stand by at least 8 inches to provide a horizontal support area of at least 3 ft.$^2$.

It is thus a feature of at least one embodiment of the invention to flexibly accommodate the need for robust support of the upwardly extending commerce satellite while reducing trip hazards.

The platform further may include sockets for accepting chair legs to hold the commerce satellite in a fixed separation from at least one chair, the fixed separation allowing use of the table and graphic terminal by an individual seated in the chair at the fixed separation.

It is thus a feature of at least one embodiment of the invention to provide a simple and robust integration of the commerce satellites with existing airport seating for flexible deployment and reduced cost.

Other features and advantages of the invention will become apparent to those skilled in the art upon review of the following detailed description, claims, and drawings in which like numerals are used to designate like features.

Figure 1:
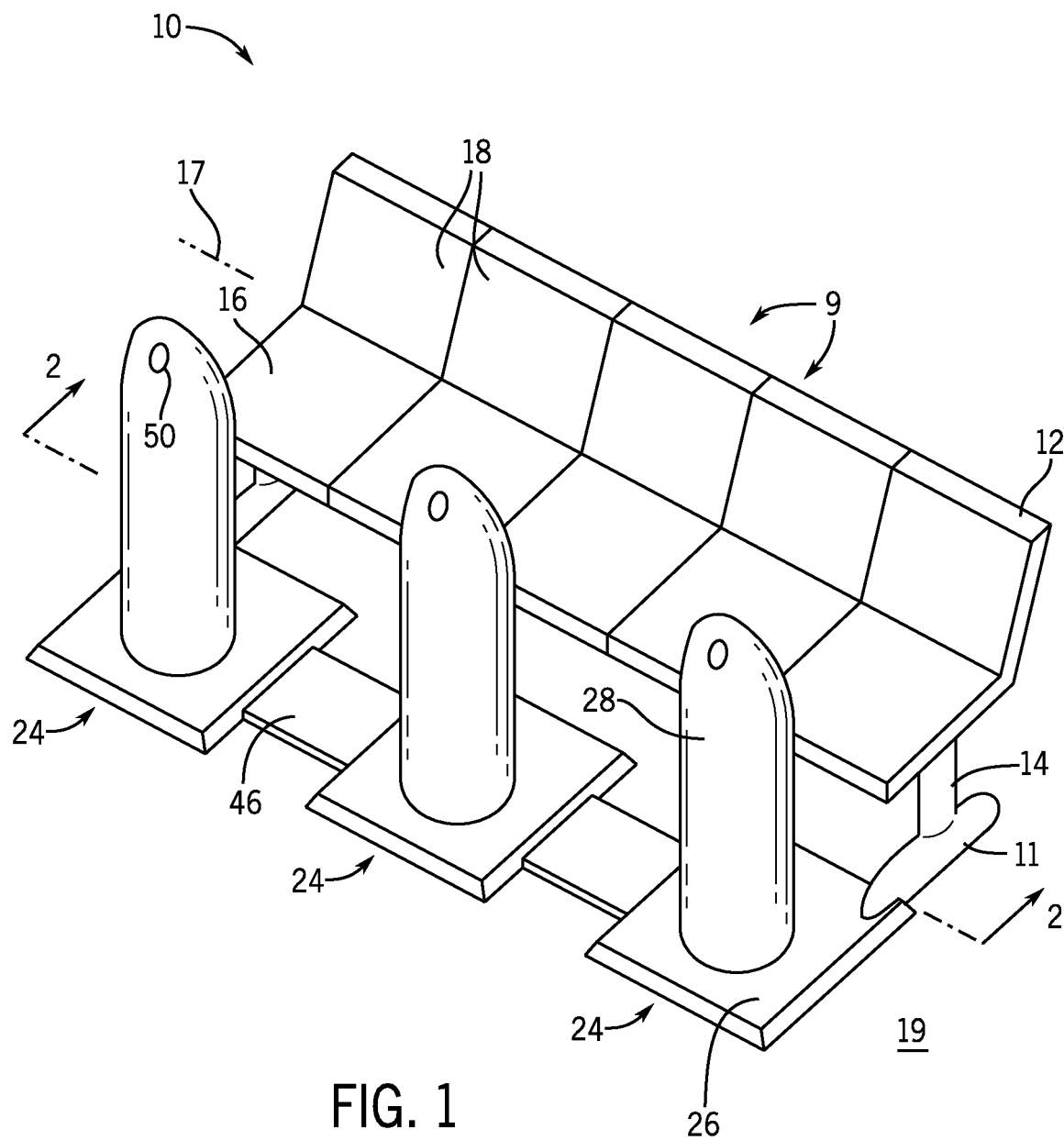
FIG. 1 is a perspective view of an airport seating unit and multiple commerce satellites positioned in front of separated seats.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a seating installation 10 may provide for set of seats 12, for example, ganged seats having common supporting legs 14. The supporting legs 14 may in turn rest on glides 11 that may be supported by the floor 19.

The set of seats 12 will generally provide multiple, horizontally extending and adjacent seat pans 16 displaced along a perpendicular horizontal lateral axis 17 with seatbacks 18 rising upwardly from a rear edge of each seat pan 16. Each seat pan 16 and seatback 18 provides a separate seat 9 for an individual (not shown).

Commerce satellites 24 may be placed in front of selected seats 9, for example, spaced every other seat or every third seat. Each commerce satellite 24 has a base platform 26 stabilizing and supporting an upwardly extending tower 28 roughly cylindrical in form.

Figure 2:
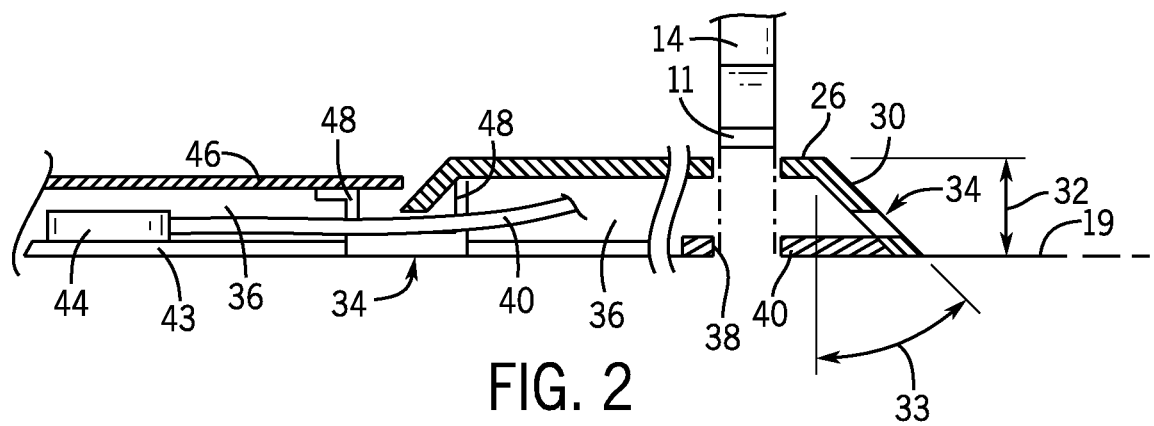
FIG. 2 is a cross-sectional view along line 2-2 of FIG. 1 showing supporting base units which may interlock with spacer units to fix the commerce satellites with respect to the seating units.

Referring also to FIG. 2, the platforms 26 for each tower 28 may be generally rectangular to provide a broad area support (typically greater than 3 ft.$^2$ in area) against a carpeted floor or terrazzo to stabilize the tower 28 without requiring cutting through the carpeted surface of the floor 19 or installing anchors in the terrazzo or subfloor. The peripheral walls 30 of the platform 26 may be sloped, for example, at an angle 33 of at least 45° from vertical and the height 32 of an upper surface of the platform 26 may be limited, for example, to less than 2 inches (and preferably less than 1 inch or less than ½ inch) so as to reduce the tripping hazard to individuals that may cross or step on the platform 26 or be passing between platforms 26 to access the seats 9. In one embodiment, the platform 26 may be a fabricated from aluminum or another rigid material to support the towers 28 against tipping.

Each platform 26 may also provide openings 34 in the peripheral walls 30 that lead to an internal hollow or covered channel area providing a cableway 36. The cableway 36 offers a protected passageway for electrical wiring 40, for example, a flexible electrical cord providing line voltage from a recessed outlet 43 in the floor 19 by means of a plug connection with plug 44. The electrical wiring 40 may be underneath the surface of the platform 26 and then pass upward into the tower 28 through an aperture (not shown) to provide power to the tower 28 as will be discussed below.

Figure 3:
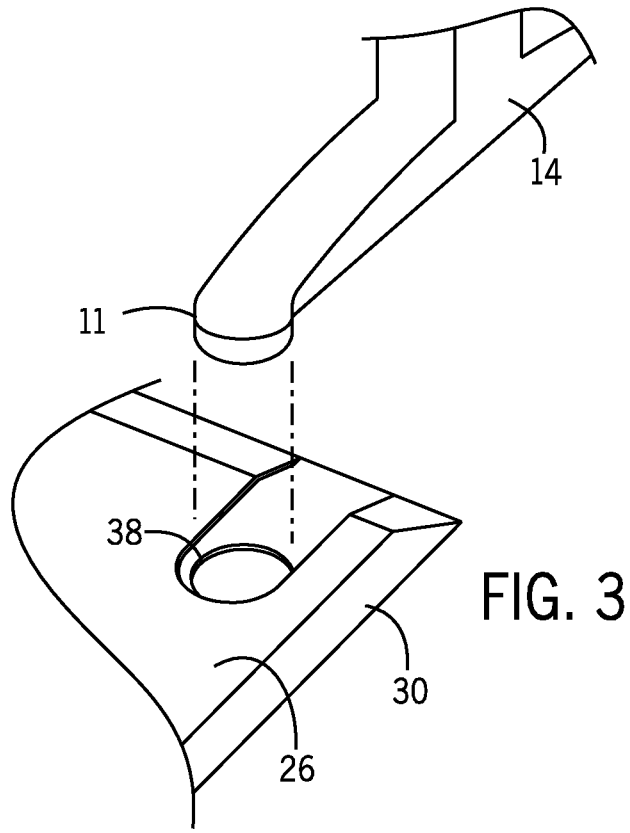
FIG. 3 is a fragmentary exploded perspective view of a front leg of the seating unit fitting into a socket of the platform to provide an interlocking therebetween.

Referring also to FIG. 3, the platforms 26 may be fixed with respect to the set of seats 12 by means of a socket 38 cut through the upper surface of the platform 26 to expose the socket 38 that may receive a glide 11 of a leg 14 therein thus locking the platform 26 and hence the commerce satellite 24 to the set of seats 12. This locking prevents sliding between these two elements without the need for complex fastener systems or the like.

Referring to FIGS. 1 and 2, the cableway 36 of the platform 26 may be extended by spacer platforms 46 that may connect pairs of separated platforms 26 at a desired social distance separation, for example, the distance of a single chair or double chair width. The spacer platforms 46 may be joined with the platforms 26 by means of an upwardly extending hook element 48 passing under a lower lip of the peripheral walls 30 of the platforms 26 and attaching to the underside of the spacer platform 46. Like the platforms 26, the spacer platforms 46 may provide a hollow or void beneath their upper surface providing a cableway 36 and continuing the cableway 36 of the platforms 26. Generally, also, a front and rear edge of the spacer platforms 46 will be beveled like the peripheral walls 30 of the platforms 26 to reduced tripping hazard, and the height of the platform 46 will be matched to be no greater than that of the platform 26 and ideally somewhat less to accommodate primary paths of foot traffic between the commerce satellites 24. In one embodiment, the left and right edges of the spacer platforms 46 toward the platforms 26 will be open to allow free passage of cabling underneath the upper surface of the spacer platform 46.

Figure 4:
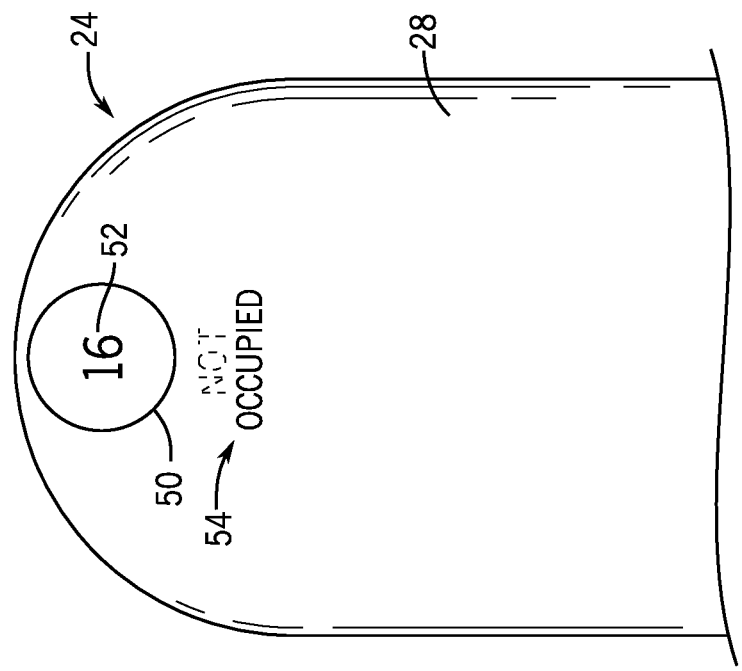
FIG. 4 is a rear elevational fragmentary view of this commerce satellite showing its marking with a unique serial number and an illuminated occupied sign.

Referring now to FIGS. 1 and 4, a rear upper face of each commerce satellite 24 may provide two illuminated signs. The first sign is a unit identifier sign 50 providing a unique identifier 52 such as a serial number to the commerce satellite 24 to allow it to be quickly identified by airport workers for the delivery of food or merchandise. In one embodiment, the identifier sign 50 may be illuminated when there is an outstanding order that has not been filled to further assist in this delivery process. A second sign is an occupied sign 54 indicating that the unit is currently occupied or in use. This occupied sign 54 may also be illuminated in a manner as to whether the commerce satellite 24 is occupied or unoccupied, for example, by having the unilluminated word "not" and the word "occupied" that can be either illuminated or not to switch between the states.

Figure 6:
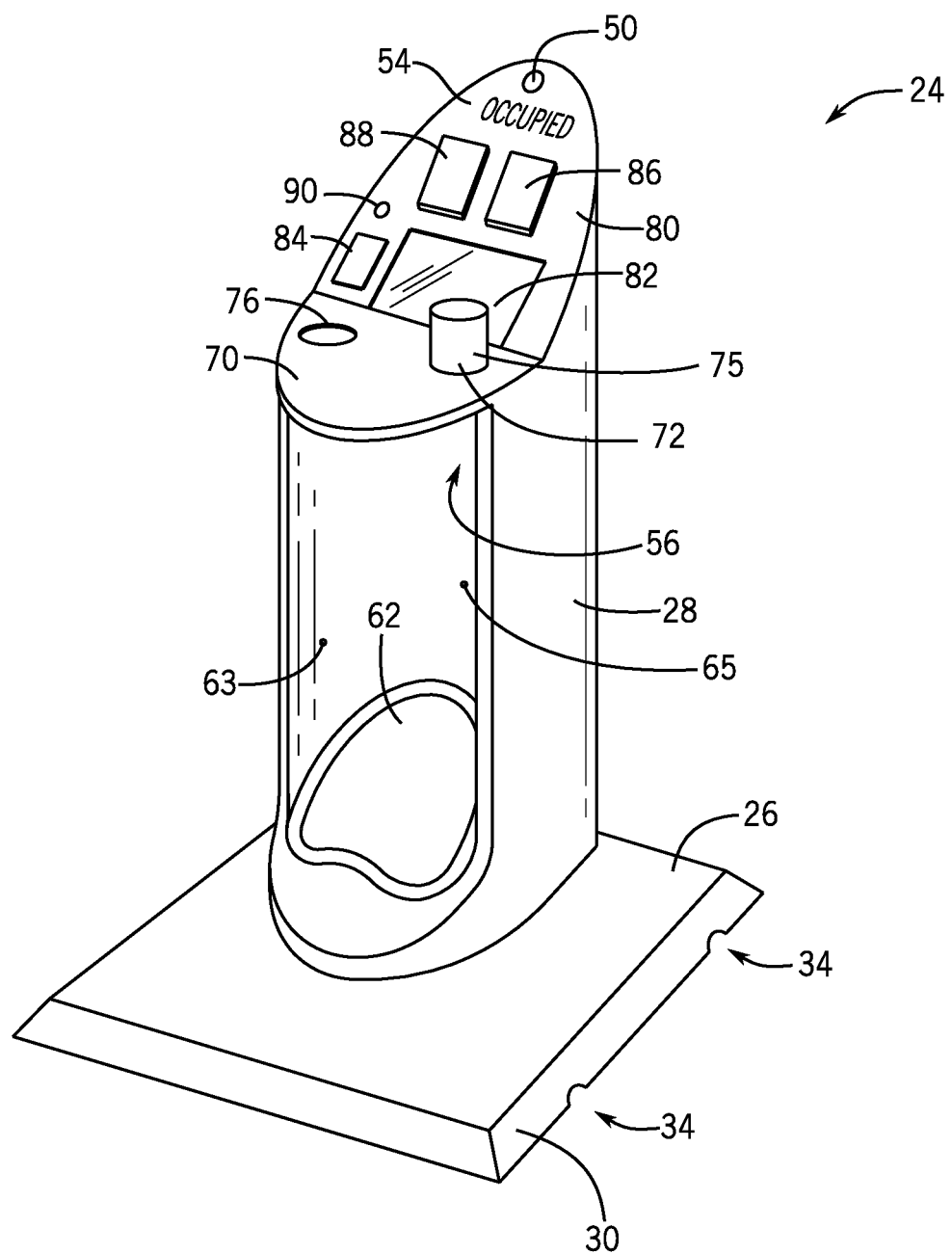
FIG. 6 is a perspective view of the commerce satellite showing a frontwardly open pocket for receiving a footrest/foot massage unit.
Figure 7:
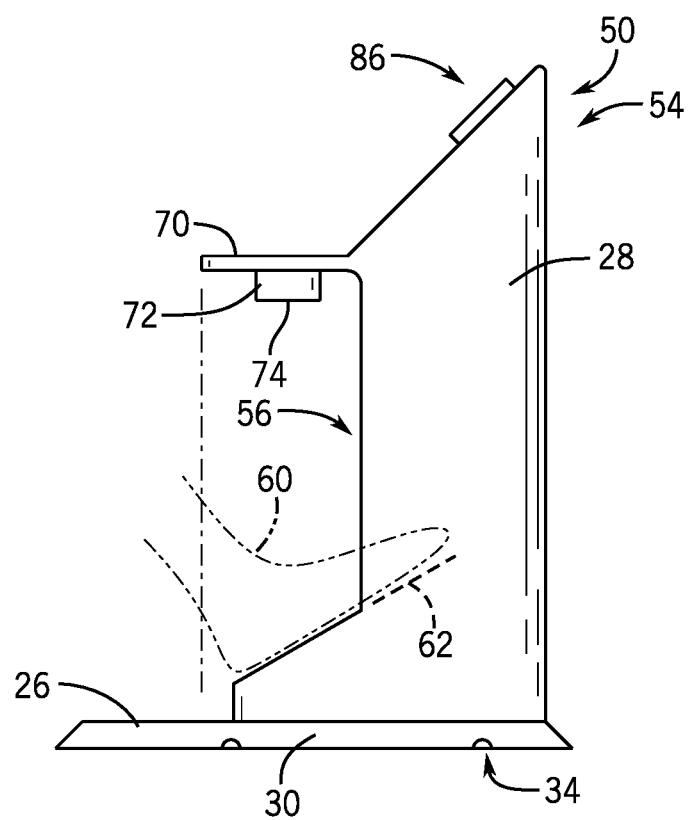
FIG. 7 is a right side elevational view of the commerce satellite of FIG. 6 showing the operation of the foot rest when positioned with respect to the seating units and the protection afforded by the table against tripping on the foot rest.

Referring now to FIGS. 6 and 7, as noted, the tower 28 may provide a generally vertical column extending upwardly from the platform 26, the latter of which may be extended on the left and right front sides by at least 8 inches therefrom for good stability. A front surface of the tower 28 may be open to present a generally hemi-cylindrical pocket 56 facing a seated user in the seats 9 so that the user's feet 60 may be inserted within the pocket 56 to rest against a sloped foot rest surface 62 positioned near the bottom of the tower 28 adjacent to the platform 26. The height of the foot rest surface 62 and the spacing of the foot rest surface 62 and tower 28 with respect to the seats 9 is such that the user's ankle may be in a relaxed "neutral" position with the toes extending roughly 90° from an axis of the lower leg thus providing an elevated foot rest for improved relaxation.

In one embodiment, the foot rest surface 62 communicates with a vibration unit (not shown) positioned beneath the foot rest surface 62 having an electric motor operating on a cam or crank and arm vibrating the foot rest surface 62 or attached to an eccentric weight for similar purpose. This vibration may help improve blood circulation in the lower legs as well as provide a relaxing massage. In one embodiment, vibration may provide whole body type vibrations having a fundamental frequency of approximately 1840 hertz. A foot massage unit suitable for this purpose is described generally in US patent applications 2012/0203150 and 2016/0000647 hereby incorporated by reference.

In one embodiment, the footrest surface 62 provides an area of about one square foot and left-to-right width of about 12 inches and front-to-rear extent of 12 inches bifurcated into two portions roughly corresponding to the shape of two feet. The foot rest surface 62 may have its front edge spaced approximately 1 to 2 inches and approximately 1 inch above the upper surface of the platform 26 and may slope backward away from the user and upward at about 45 degrees.

The inner surface of the pocket 56 may optionally expose a foot sensor 63 for detecting the presence of the user's feet on the foot rest surface 62, for example, using an infrared proximity sensor or the like. In addition, the pocket 56 a provide a motion sensor 65, for example, using a passive infrared device (PIR) directed toward the seat 9 to detect the presence of a seated individual.

Figure 5:
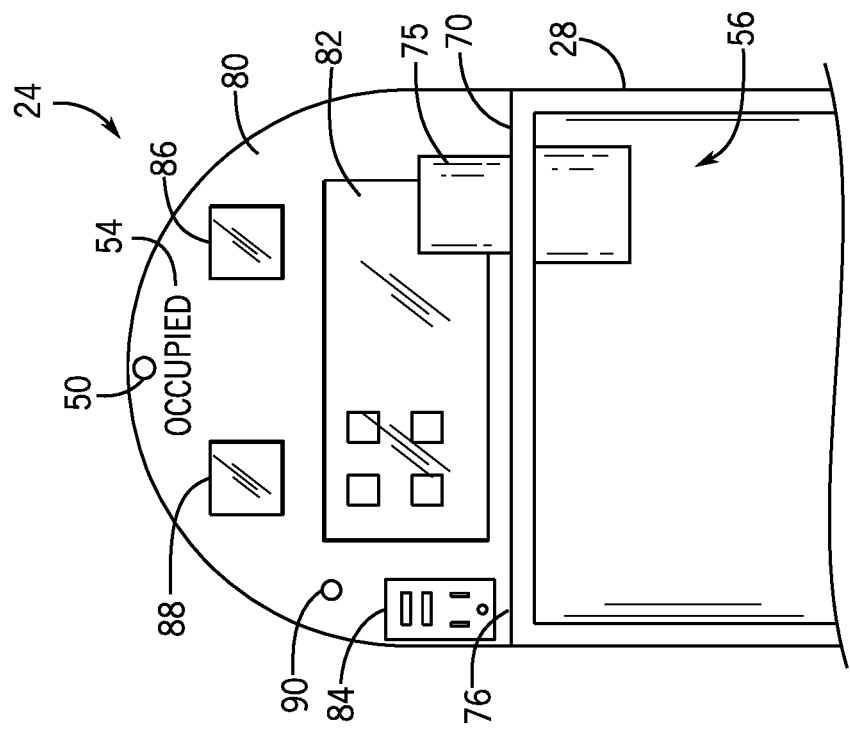
FIG. 5 is a figure similar to that of FIG. 4 showing the front surface of the commerce satellite presenting a display unit and forwardly extending table as well as charger outlets, a wireless charger, and bill acceptors and credit card readers suitable for electronic commerce.

Referring now to FIGS. 5, 6, and 7, the upper end of the tower 28 may provide for a cantilevered table 70 providing an upper horizontal surface extending forwardly toward the seated user at a height for convenient use by the seated user typically in a range from 28 to 30 inches from the floor. An outer periphery of the table 70 may extend beyond the periphery of the footrest surface 62 to help guide the user around the footrest surface 62 when crossing in front of the commerce tower 28. The upper surface of the table 70 may include a cupholder 72, for example, providing a downwardly extending circular opening in the upper surface of the table 70 opening into a lower pocket 74 for receipt of a cup or beverage can 75. The cupholder 72 allows a depth of insertion (e.g., 1-3 inches) and an opening in close conformity to the outer periphery of a cup or can 75 to resist accidental tipping or dislodgment of that cup 75, for example, by lateral motion of the user's hand. A wireless charging pad 76 may also be presented at the upper surface of the table 70 to allow for wireless charging of devices such as cell phones or the like.

A rear edge of the table 70 joins to an upwardly extending backsplash 80 preferably sloping backward away from the seated user, for example, by an angle of approximately 45°. The backsplash 80 may frame a flush-mounted graphics touch screen 82 having graphic and text display capabilities and touch sensitivity to allow for user input and output as will be discussed below. To one side of the touch screen 82, a charging outlet 84 may be provided, for example, providing a standard line voltage outlet plug and low voltage outlet plugs, for example, conforming to the USB standard. The graphic touch screen 82 and charging outlet 84 may be located slightly above the upper surface of the table 70 to resist spills on the table 70 which otherwise provides a continuous and seamless connection with the backsplash 80 for easy cleaning and sanitation.

Positioned above the touch screen 82 on the backsplash 80 are a bill accepter 86 and credit card reader 88 of conventional design. These units allow secure payment by the user for goods or services at the commerce satellite 24 as will be discussed further below. In addition, a secondary occupied sign 54' may also be provided at the upper edge of the backsplash 80 as well as a secondary unit identifier sign 50' mirroring those previously described to provide information to the user. Alternatively this information may be displayed on the graphics touch screen 82.

In one embodiment, the backsplash 80 may provide a headphone jack 90 to allow the user to listen to instructions, advertisements, or music through his or her headphones without disturbing adjacent seated individuals.

Figure 8:
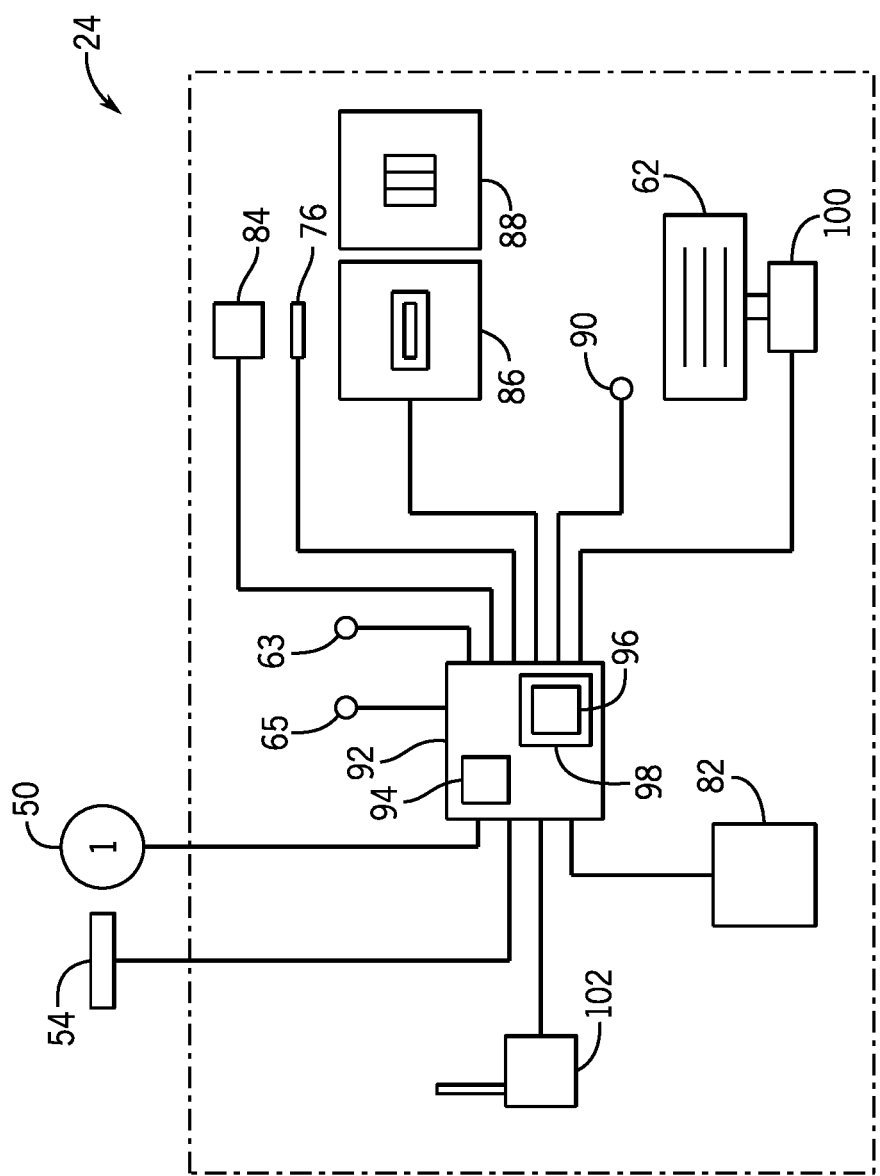
FIG. 8 is a schematic block diagram of the commerce satellite of FIG. 2 showing its principal components including a computer which may communicate with various components of the commerce satellite.

Referring now to FIG. 8, the commerce satellite 24 will provide for a controller 92 positioned, for example, behind the backsplash 80 and including a processor 94 executing a stored program 96 in computer memory 98 and providing I/O circuits for sending control or power signals to or receiving data from the various other components of the commerce satellite 24. In this regard, the controller 92 may control a motor 100 for vibrating the footrest surface 62 thereby allowing the controller 92 to turn the massage unit on and off. In addition, the controller 92 may control power to a charging outlet 84 and wireless charging pad 76 useful for charging portable devices. The controller 92 may also receive signals from the credit card reader 88 and bill accepter 86 indicating money has been received and the amount of money. Signals may also be received from the sensor 63 and motion sensor 65 indicating. Respectively, whether the individual's feet are on the footrest surface 62 or an individual is seated in the seat 9. The controller 92 may also control illumination of the unit identifier sign 50 to indicate a pending order and the occupied sign 54 by controlling associated lamps. The controller 92 may also communicate with the headphone jack 90 or similar Bluetooth transmitter for transmitting audio information to a user and may provide signals to and receive signals from the touch screen 82.

Significantly, the controller 92 may communicate with a wireless transceiver 102, for example, connecting through Wi-Fi to other devices in the airport either directly or through a server system. Power to the controller 92 and the wireless transceiver 102 and various other components described above may be provided through the wiring described with respect to FIG. 2 above.

Figure 9:
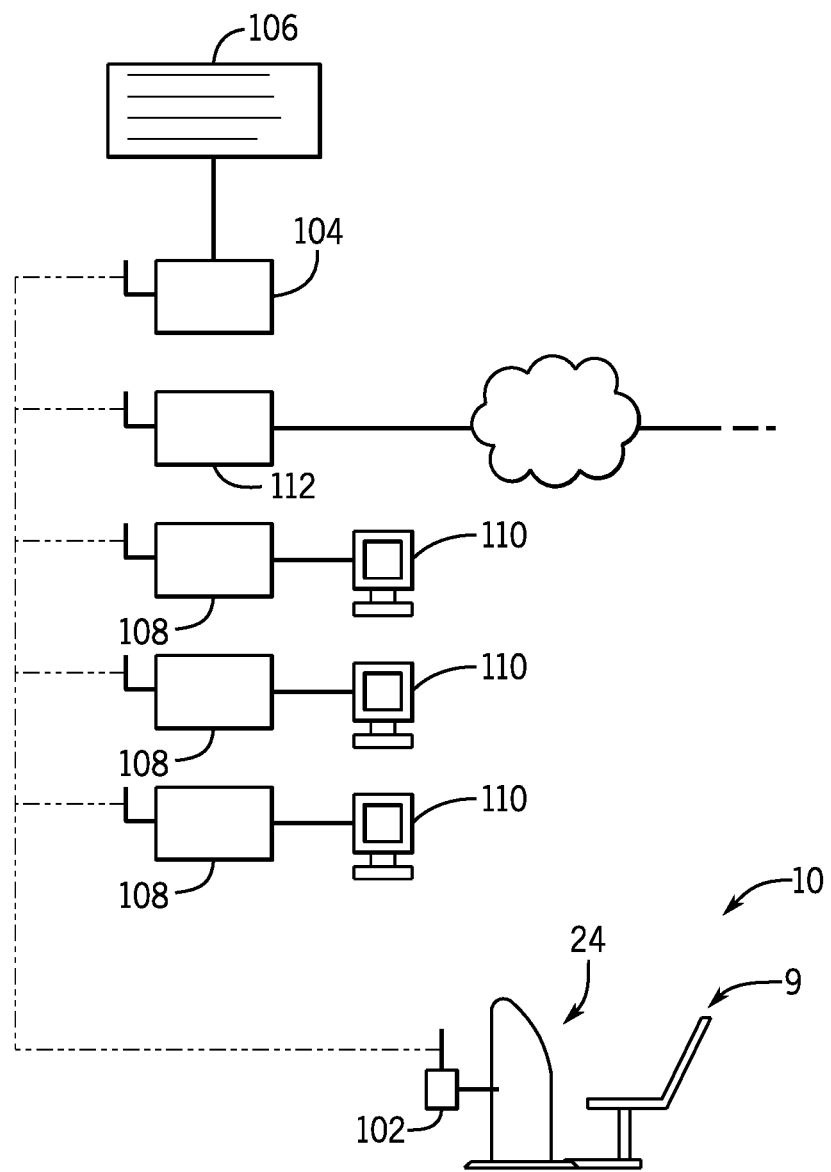
FIG. 9 is a system diagram showing intercommunication between the commerce satellites and order systems of merchants within the airport, the advertising server, and a flight information server.

Referring now to FIG. 9, the commerce satellite 24 may communicate through the wireless transceiver 102 with various other airport devices including a flight information display transmitter 104 transmitting flight information such as information about arriving and departing flights including flight numbers and delays. This information may be displayed on the touch screen 82 thus eliminating the congestion and crowding around this flight information when displayed on a central flight information board 106. The transceiver 102 may also communicate with multiple wireless transceivers 108 associated with terminals that provide order portals 110 that may be located at airport businesses to receive orders from the user through the commerce satellite 24. These order portals receive the order information, indicating that a payment has been made, and the unique identifier for a particular commerce satellite 24 to allow the order to be delivered to the customer without the need for the customers to congregate in a line or at a dense restaurant serving area. In addition, the transceiver 102 may connect with an advertisement server 112 which can serve up advertisements and receive log information indicating advertisements that have been viewed by an individual.

Figure 10:
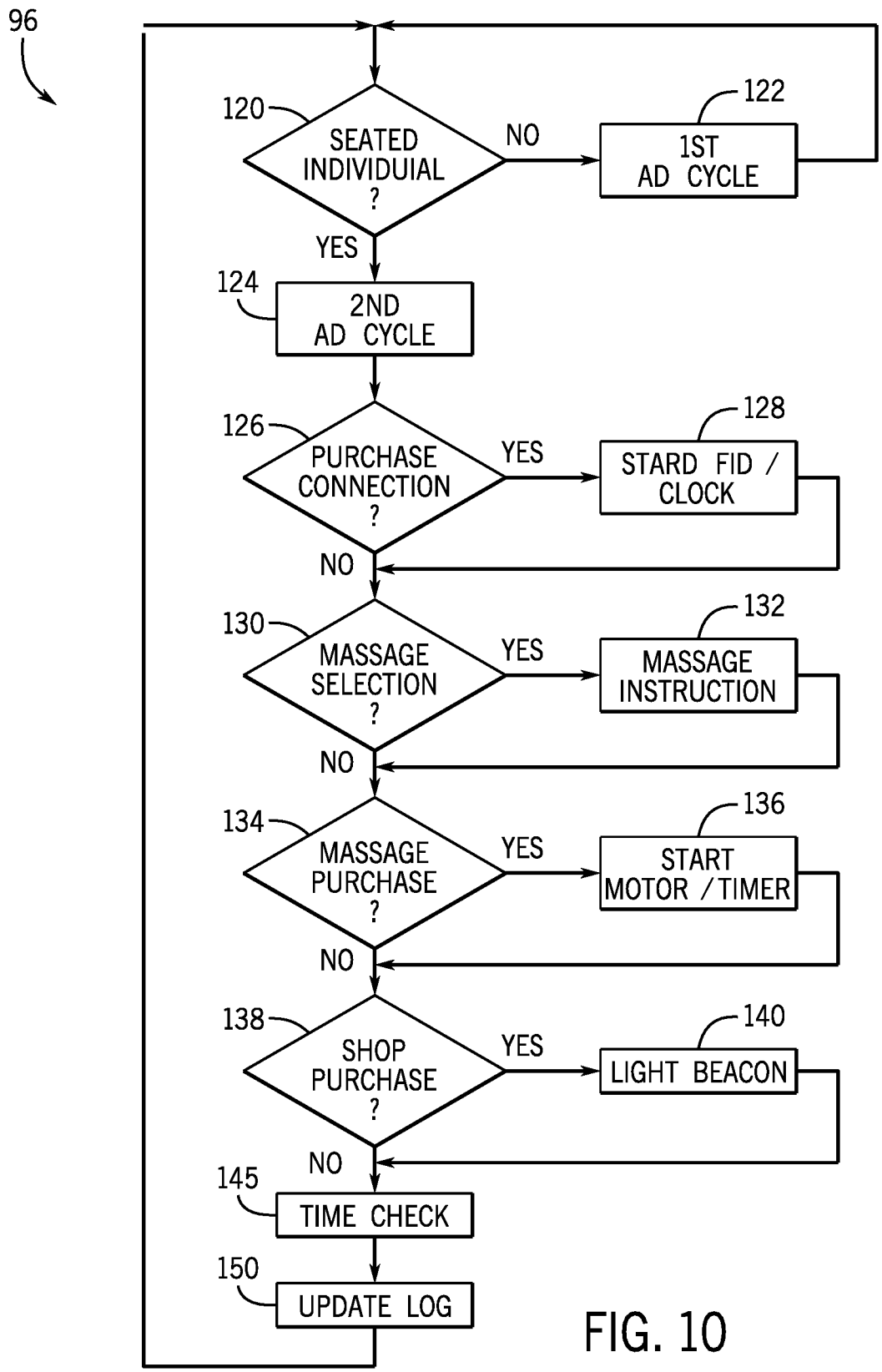
FIG. 10 is a flowchart of the operation of a program of the computer of FIG. 8 implemented in the present invention.

Referring now to FIG. 10, the program 96 may operate to check whether there is a seated individual in the associated seat 9 per decision block 120 using motion sensor 65. If there is no seated individual, the commerce satellite 24 may provide a first advertisement cycle obtained from the server 112 as indicated by process block 122, for example, periodically serving up advertisements for the use of the commerce satellite 24 itself. In one embodiment, these advertisements may be without sound so as to prevent disturbing adjacent passengers and may be spaced by periods of silence.

If there is a seated individual in the adjacent seat 9, as determined by decision block 120 interrogating the motion sensor 65, the commerce satellite 24 may initiate a second advertisement cycle indicated by process block 124 including third-party advertisements not necessarily associated with the airport or the commerce satellite 24, as well as airport advertisements describing restaurants and the like as well services provided directly by the commerce satellite 24 such as the ability to obtain a foot massage and other services directly at the commerce satellite 24. Generally, this second advertisement cycle will be substantially continuous and displayed on the touch screen 82 while an individual is seated in the seat opposite the commerce satellite 24 to promote use of the commerce satellite 24. The advertisements also serve to encourage the user to allow other users who wish to use commerce satellite 24 to trade places if the user does not wish to view advertisements. Selected advertisements in the second advertisement cycle per process block 124 will activate the touch screen feature of the touch screen 82 allowing the user to make a selection of services offered from various restaurants and businesses in the airport that are available to the user at the location of the seat 9. These advertisements may be tailored according to the location of the commerce satellite 24. Thus if the commerce satellite is in a secured area, for example, past baggage screening, only businesses in that secured area will be displayed or specially marked to indicate that delivery can be had from these businesses without passing through the airport security check. By selecting a service or restaurant, more information is provided about the service or restaurant's offerings and an opportunity to place an order.

One of the services offered at the advertisement cycle of process block 124 is the purchase of connection services at the commerce satellite 24 as determined by decision block 126. If the individual chooses to purchase connection services and provides the necessary payment through the credit card reader 88 or bill accepter 86, connection services including display of flight information and a clock may be provided on the touch screen 82 together with an advertisements from the second advertisement cycle of process block 124 as indicated by process block 128. At this time, the occupied sign 54 may be activated. Typically the user will purchase a fixed amount of time of connection for a certain sum, however; the user may add additional money to provide for a credit for additional services, purchase of goods or the like. Once connection time is purchased, the USB port may be activated as indicated by a light so that charging of a phone or similar appliance can be performed. Purchasing connection services can provide the user with a discount for using the foot massage.

At decision block 130, a signal from the sensors 63 may indicate that the user has placed his or her feet on the foot rest surface 62 which will interrupt the second advertisement cycle to provide an advertisement for the invigorating effects of the foot massage and instructions on how to initiate a massage as indicated by process block 132. If at subsequent decision block 134, the user purchases a foot massage through the bill accepter 86 or credit card reader 88 or using a stored credit, the motor 100 of the foot massage unit is started, and a timer is started per decision block 136.

At decision block 138, the touch screen 82 may indicate a purchase by the user from one of the local shops or restaurants through a touch screen menu system allowing each shop and restaurant to provide a display menu or catalog on the touch screen of food or products that can be delivered to the seat 9 or obtained directly from the shop. If the customer selects a product, for example, food, to be delivered to the seat 9 using the touch screen 82, payment may be made through the bill accepter 86, credit card reader 88, or a stored credit may be used. Once payment is made, unit identifier sign 50 will be illuminated per process block 140 allowing service personnel to deliver the order promptly. The order, when made, may be accompanied by a time requested by the customer (for example, indicating a departing flight) and both the order and time request may be received by one of the order portals 110 together with the identifier 52 of the commerce satellite 24. Upon receiving the order at an order portal 110, the order portal 110 may provide a confirming signal back to the user and periodic updates on the delivery of the food or merchandise for display on the touch screen 82.

At process block 145, timers for the connection purchase or for the foot massage purchase are checked and updated to turn these services off if the time has expired after giving the user an opportunity to purchase more time through the touch screen 82. The unit identifier sign 50 and touch screen 82 remain activated until the order is received as indicated by the restaurant using one of the portals 110.

At process block 150, log data may be sent to the server 112 indicating those advertisements that were shown while the user was seated in the seat as well as purchases made through the unit to provide the airport with immediate feedback as to the revenue-enhancing properties of the commerce satellite 24.

It will be understood generally that the graphic terminal described herein need not be a touch screen but may include a graphic display and mechanical keyboard or other similar functional devices.

Certain terminology is used herein for purposes of reference only, and thus is not intended to be limiting. For example, terms such as "upper", "lower", "above", and "below" refer to directions in the drawings to which reference is made. Terms such as "left", "right", "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence, or order unless clearly indicated by the context.

The description of a computer processor or controller herein should be understood to include local or remote processors or execution in one or more distributed processors into communicating by means of wireless or wire connections as is generally understood in the art.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A workstation array comprising:
   a set of workstations each having:
   a stand having a base supportable against a floor;
   a table supported by the stand at an elevation for use by a seated individual adjacent to the stand, wherein the stand includes a forwardly open pocket near the base providing a sloped platform for receiving feet of the seated individual elevated from the floor and wherein the sloped platform is connected to a motor unit for vibration of feet of the seated individual;
   wherein the bases are joined by a platform extending laterally from the stands and providing a covered cableway for electrical wiring between the workstations and at least one recessed outlet in the floor, the bases separated to provide a passageway for individuals passing between bases over the platform; and
   wherein the platform further includes anchors adapted to accept chair legs of chairs of a free standing chair assembly of chairs attached to each other above the platform and side-by-side in a row, each chair as supported on multiple frontwardly and rearwardly extending legs, the anchors operating to hold the workstation array in alignment with and at a fixed separation and angle from chairs of the chair assembly, the fixed separation and angle allowing use of the table and foot placement on the sloped platform by at least one individual seated in at least one of the chairs of the chair assembly;

wherein the bases are spaced on the platform and cooperate with the anchors to position the bases in front of some chairs of the chair assembly and the passageways in front of other chairs of the chair assembly; and further including the free standing chair assembly of chairs attached to each other above the platform and side-by-side in a row as supported on frontwardly and rearwardly extending legs, the anchors operating to hold the workstation array in alignment with and at a fixed separation from chairs of the chair assembly, the fixed separation allowing use of the table and foot placement on the sloped platform by at least one individual seated in at least one of the chairs of the chair assembly.

2. The workstation array of claim 1 wherein each workstation further includes:

a graphic terminal supported by a stand to provide a graphic display and a user input interface for use by the seated individual;

a wireless transceiver; and a computer processor supported by the stand and communicating with the graphic terminal and with the wireless transceiver and operating according to a stored program to:

(a) display to the user an order menu through the graphic display;

(b) receive input from the user input identifying an order from the order menu;

(c) transmit the order to a remote order provider together with identification uniquely identifying a commerce satellite system so that the order may be delivered to the user; and wherein the order menu links items to item prices and further including a charge terminal providing at least one of a credit card reader and bill accepter communicating with the computer processor and wherein the computer processor further provides an indication of payment of the item price in the transmission of the order.

3. The workstation array of claim 2 wherein the computer processor receives flight information data from the wireless transceiver and formats this information for display on the graphic terminal.

4. The workstation array of claim 1 further including an electrical outlet positioned adjacent to the table and providing at least one of a line output voltage and 5 V output voltage.

5. The workstation array of claim 1 wherein the table further includes an embedded wireless charging unit.

6. The workstation array of claim 1 wherein the table further includes at least one upwardly open socket for receiving a beverage can or cup stably therein.

7. The workstation array of claim 1 wherein the table extends in cantilever over the pocket to beyond a lateral extent of the pocket periphery.

8. The workstation array of claim 1 wherein the stand provides an illuminated sign indicating that the stand is in use.

9. The workstation array of claim 1 wherein the stand includes a visual marking uniquely identifying the commerce satellite.

10. The workstation array of claim 1 wherein the stand includes an illuminated marking indicating an order has been placed.

11. The workstation array of claim 1 wherein the table surface extends continuously at a rear edge to an upwardly and rearwardly sloped backsplash and wherein the graphic display is supported within the backsplash.

12. The workstation array of claim 1 wherein the platform provides peripheral edges angled by at least 45° outwardly from an upper horizontal surface of the platform.

13. The workstation array of claim 1 further including at least one spacer platform releasably attachable to the platform to provide a continuation of a cableway between the spacer platform and the platform.

14. The workstation array of claim 1 wherein the platform has a height from the ground of less than 1 inch extending laterally from the stand by at least 8 inches to provide a horizontal support area of at least 3 ft.

15. The workstation array of claim 1 wherein the anchors are upwardly extending apertures receiving downwardly extending portions of the frontwardly extending legs.

* * * * *